Feb. 8, 1966  J. E. GILL  3,234,319
OVERHEAD CABLE SYSTEMS
Filed Nov. 8, 1963  5 Sheets-Sheet 1
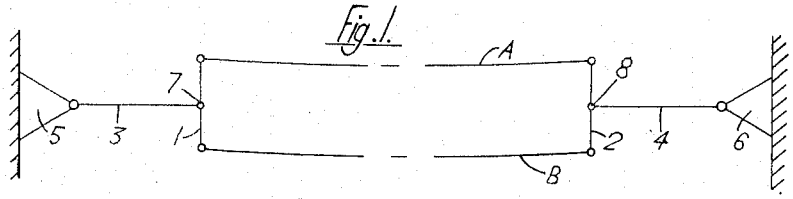
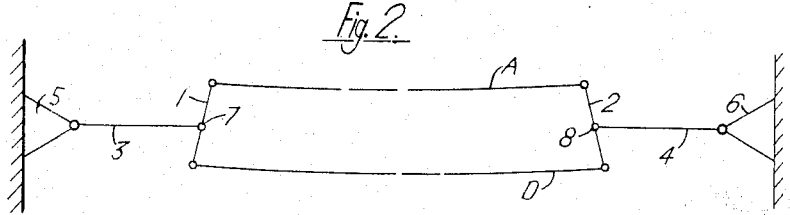
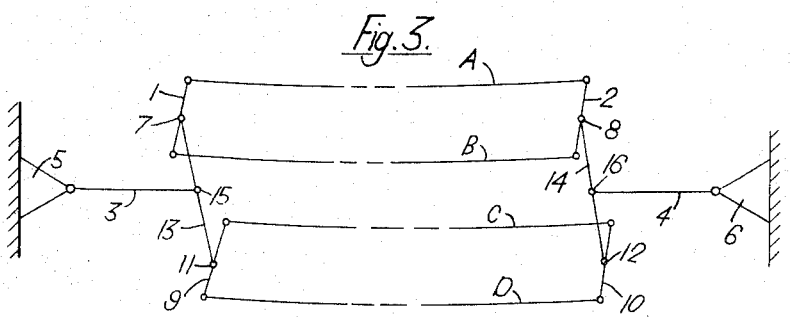
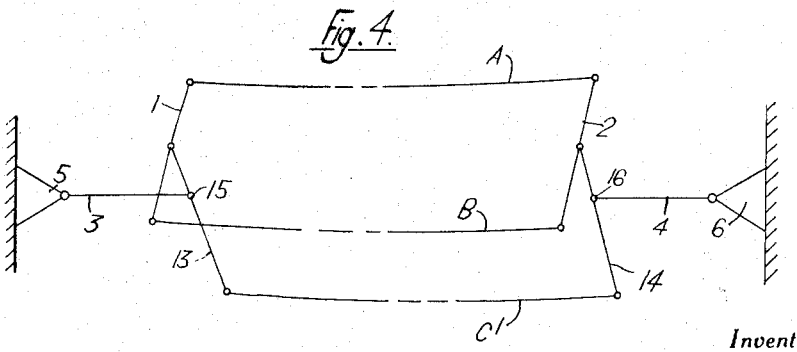
Inventor
JOHN EDWARD GILL
By Irwin J. Thompson
Attorney

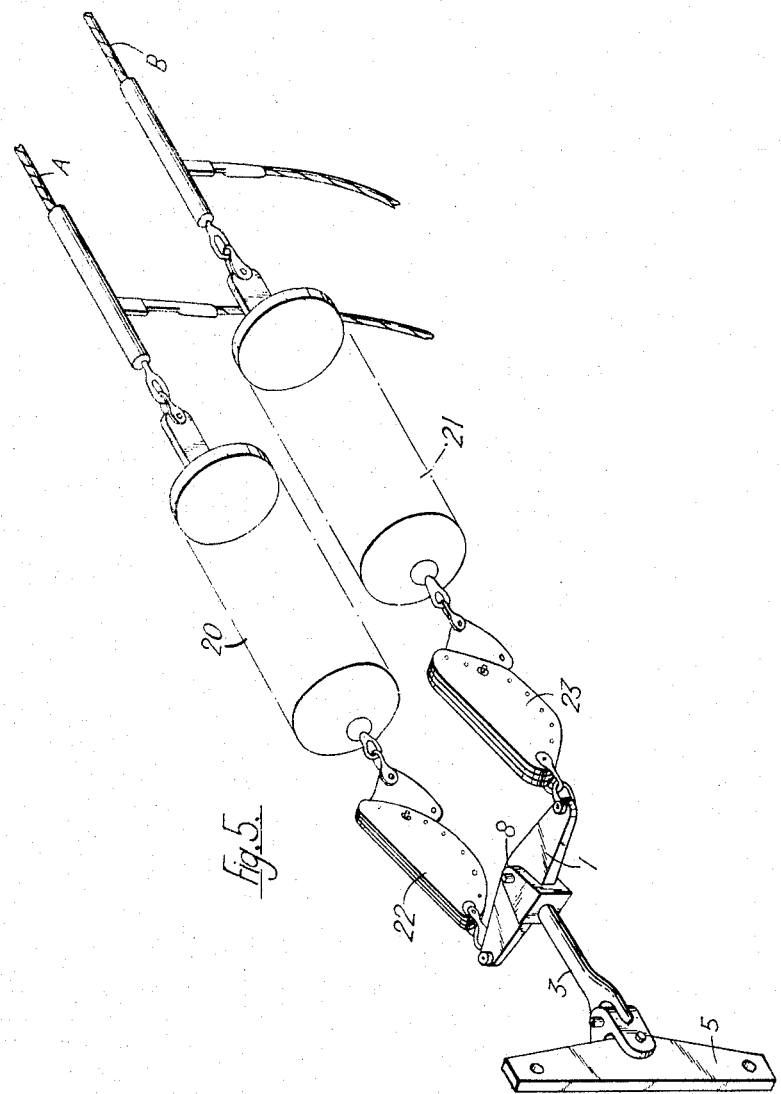

Feb. 8, 1966 J. E. GILL 3,234,319
OVERHEAD CABLE SYSTEMS
Filed Nov. 8, 1963 5 Sheets-Sheet 3
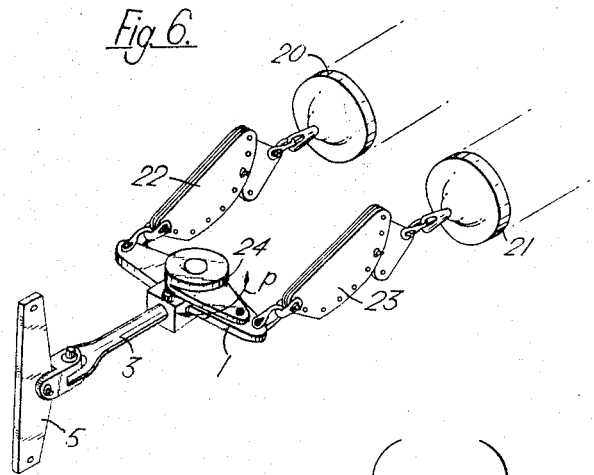
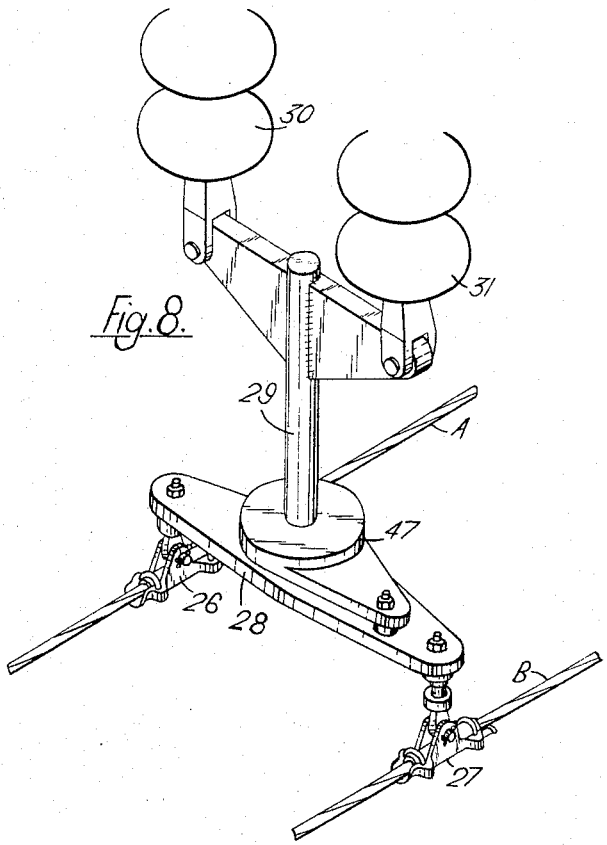
Inventor
JOHN EDWARD GILL
By Irwin S. Thompson
Attorney

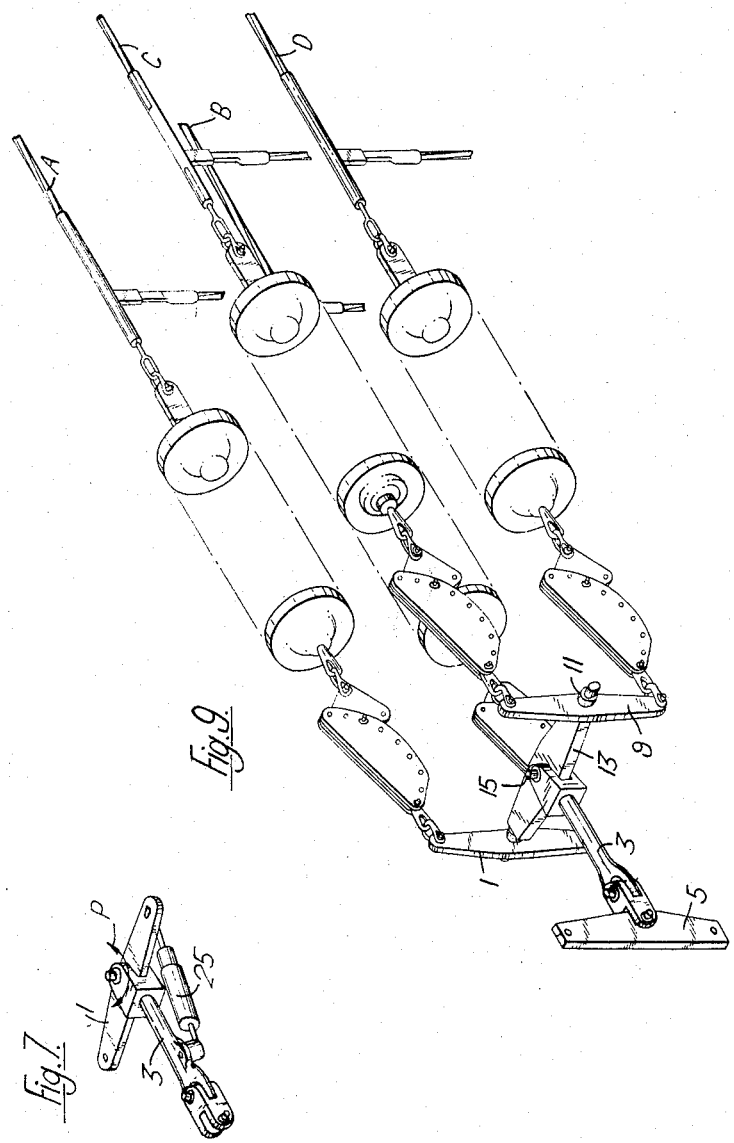

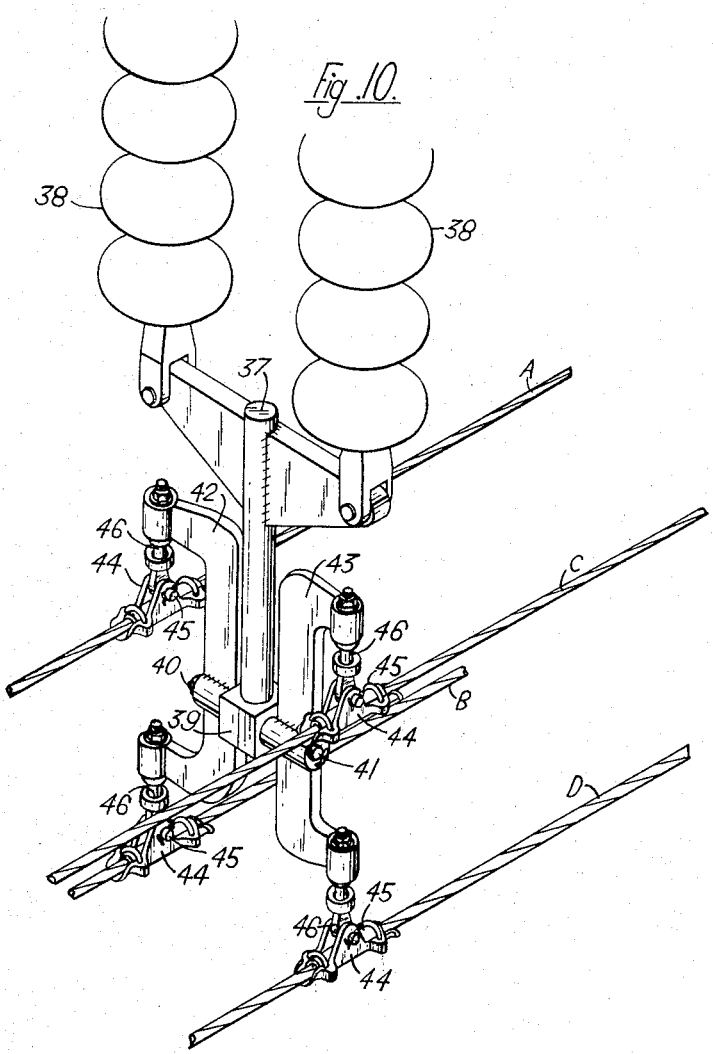

United States Patent Office 3,234,319
Patented Feb. 8, 1966

3,234,319
OVERHEAD CABLE SYSTEMS
John Edward Gill, Warley, Brentwood, England, assignor to Unidare Limited, Unidare Works, Finglas, Ireland, a limited-liability corporation of Ireland
Filed Nov. 8, 1963, Ser. No. 322,482
Claims priority, application Great Britain, Nov. 12, 1962, 42,674/62
2 Claims. (Cl. 174—43)

This invention relates to overhead cable systems such as are used for electrical transmission in which there are groups of electric cables, all the cables in each group appertaining to a single phase. In these systems the cables in each group, which are usually known as a bundle, are arranged very close to each other and this has given rise to some difficulties. There may be only a pair of cables in each bundle arranged either side by side or one above the other, or there may be three or four cables or sometimes more. In the latter cases the cables are arranged symmetrically, at the corners of an equilateral triangle, at the corners of a square or rectangle or at the corners of a regular polygon. The cables normally have similar physical characteristics, namely dimensions, weight per unit length, and elastic properties.

It has been the usual practice to suspend each of the cables in a bundle independently from the pylons or other supports. Each cable, therefore, hangs between two supports in its own catenary which is unaffected by the other cables. There is a tendency however, for the cables in one bundle to expand differentially, because one cable may become heated more than the others by the sun, or alternatively, may be cooled more than the others by the wind in a particular direction. As the cables are quite close to each other initially, even quite small differences in length of about one inch over a whole span may cause the cables to form different catenaries and in some formations to interfere with each other.

The present invention aims at overcoming this difficulty, and according to the invention, the cables in a bundle comprising at least two cables of similar span and similar weight per unit length are connected at the end of a span to a system of pivoted levers whereby the turning moment exerted upon a lever of the first order about its fulcrum by the tension in one cable is precisely counterbalanced by the turning moment of the opposite sense exerted upon said lever about said fulcrum by the tension in another of the cables.

When there are at least three cables in a bundle the ends of the cables are connected to a system of levers whereby the turning moment exerted upon one lever of the first order about its fulcrum by one of the cables is precisely counterbalanced by the turning moment of the opposite sense exerted upon said lever about said fulcrum by another of the cables, and the resultant force acting at said fulcrum due to the tension in both of said cables is applied to exert a turning moment on a second lever of the first order about its fulcrum which is precisely counterbalanced by a turning moment of the opposite sense exerted on said second lever about its fulcrum by the tension in one or more of the remaining cables.

The lever systems arranged as above stated may be provided at one end only or at both ends of a cable. If the cable extends continuously over a number of spans it is only necessary to provide said lever systems at the ends of the lengths of cable, while at the intermediate points where the cables are to be supported, they are arranged in pairs and respectively connected to the opposite ends of a lever which is itself pivotally supported intermediately.

With the arrangements according to the invention, if one or more of the cables expands more than the others, the tension in the expanding cables decreases and the equilibrium of the supporting lever is upset so that it rocks about the centroid of the points of attachment to it of the cables to such an extent that equilibrium is again restored and the tensions in all the cables are again substantially equal. As a result, the expanded cable does not show a sag greater than any other cable and the geometrical form or aspect of the cross-section of the bundle remains substantially unchanged so that there is no possibility of interference between the various cables in the bundle and they are maintained substantially equidistant from each other along their whole lengths.

In its simplest form the means according to the invention for supporting the cables at one end of a span comprises a lever having points spaced apart for the attachment of the adjacent ends of two parallel cables, and a fulcrum midway between, and on a centre line joining, said points of attachment whereby the lever may be pivotally suspended from a pylon or other support. When four cables are involved each pair of cables may be similarly attached to opposite ends of levers which are themselves pivoted at their centres upon the opposite arms of a third lever so as to be pivotal in planes perpendicular to the plane in which said third lever is pivotal about a central fulcrum by which it is suspended. In all cases the fulcrums of the levers lie upon centre lines passing through the adjacent pivots of the lever or the points of attachment thereto of the cables. Corresponding arrangements may be provided for any number of cables, as will be apparent from the following description with reference to the accompanying drawings which show some practical forms which the invention may take.

In the drawings—

FIGS. 1, 2, 3 and 4 are diagrams illustrating the principle on which the invention is based, FIG. 5 is a perspective view, partly diagrammatic, showing an anchorage system for two cables according to the invention, FIGS. 6 and 7 show modifications of a detail of FIG. 5.

FIG. 8 is a perspective view of an intermediate support for two cables according to the invention, FIG. 9 is a perspective view, partly diagrammatic, showing an anchorage system for four cables, FIG. 10 is a perspective view of an intermediate support for four cables.

Corresponding parts are indicated by similar reference numerals in all the views.

Referring to the drawings,

FIG. 1 represents diagramatically two cables, A, B of equal length, freely suspended from opposite ends of similar levers 1, 2 respectively pivoted by links 3, 4 to the fixed supports or anchorages 5, 6, which are normally provided by pylons. The links 3, 4 are pivoted to the levers 1, 2 by pivots 7, 8, disposed midway between the opposite ends of the levers 1, 2 to which the cables A and B are attached. For perfect operation it is essential that the three pivot points on the levers 1 and 2 lie in a straight line.

If one of the cables, for example, the cable B expands without a corresponding expansion of the cable A the levers 1 and 2 will adjust themselves as represented in FIG. 4 (greatly exaggerated), since the tensions in the two cables must balance one another, with the result that the catenary curves of the two cables remain practically identical.

FIG. 3 shows by a perspective diagram how a similar effect may be obtained with a bundle of four cables A, B, C, D. The cables C and D are connected to the ends of a pair of levers 9, 10, the centres 11 and 12 of which are pivotally connected to the centres 7 and 8 of the levers 1, 2 by transverse levers 13, 14. In this case the links 3, 4 are respectively pivoted to the centres 15, 16 of the transverse levers 13, 14. As a result of this arrangement, if the length of any cable undergoes a small change, all four cables will adjust themselves so as to maintain equal tensions in all the cables and consequently all the cables will maintain a similar form of catenary.

The principle explained above with reference to FIGS. 1 to 3 is not limited to bundles of two or four cables, it being only necessary to arrange the system of levers so that the turning moment applied by the cables to the levers about the fulcrums of the respective levers are in equilibrium. Thus in the arrangement represented in FIG. 4, three cables A, B and $C^1$ are shown, whereof the cables A and B are connected to levers 1 and 2, as in FIGS. 1 to 3, and equilibrium with the cable $C^1$ is maintained by connecting the latter directly to one arm of the transverse levers 13, 14, this arm being twice as long as the other arm of said levers pivoted to the centres 7 and 8 of the levers 1 and 2 respectively. The turning moments applied by the cables A and B about the fulcrums 7 and 8 of the levers 1 and 2 will balance, while the turning moment applied to the transverse levers 13 and 14 about the pivots 15, 16 by the combined tensions in the cables A and B is balanced by the turning moment about the centres 15 and 16 due to the tension in the cable $C^1$. Thus, the tensions will be equal in all three cables A, B and $C^1$, and their catenaries will remain similar to each other irrespectively of slight variations in the lengths of the individual cables.

Although in the diagrams of FIGS. 1 to 4 both ends of the cables are represented as being connected to pylons or supports 5 and 6 through the intermediary of similar lever systems, the same results may be obtained if such a lever system is applied to only one end of the bundle of cables, the other end being rigidly connected to the support at that end. Again, the same principle of suspension may be applied to the intermediate suspension points where a bundle of cables extends continuously over a number of spans.

Practical examples of suspension arrangements according to the invention are shown in FIGS. 5 to 10 of the accompanying drawings.

FIG. 5 shows two cables A and B, the ends of which are connected by insulators 20, 21 (represented in outline only) and sag adjusters 22, 23 to opposite ends of the lever 1. A link 3 pivotally connects the centrally located pivot 8 of the lever 1 to an anchor plate 5. The latter is adapted to be bolted to a pylon or other support (not shown) in well known manner.

The suspension devices 20, 21, 22, 23 are of well known construction and when the cables A and B are initially installed they are suitably strained and adjusted so as to hang with an equal amount of sag in similar catenaries with the lever 1 in a medial position, i.e. with its centre line which passes through the pivot 8 and the pivotal centres of the points of attachment to the lever of the cables A and B approximately perpendicular to the longitudinal axis of the link 3. The tensions in the cables A and B are necessarily equal. If the length of either cable changes relatively to that of the other cable, for example, due to "creep" or temperature variation, this will tend to alter the tension of one cable relatively to the other, but the lever 1 will at once restore the balance by turning upon its fulcrum 8. The cables will therefore maintain their parallel alignment throughout their span. The extent to which the lever 1 may turn is limited, for example, by the form of the bifurcated end of the link 3 in which it is pivoted. If desired it may be lightly biassed towards a middle position.

In order to eliminate the effect of vibration of the cables, which might otherwise cause the lever 1 to oscillate instead of maintaining a steady position, damping devices are preferably associated with the layer 1 and the link 3 to which it is pivoted. FIG. 6 shows a friction damper 24 of well known type having one member secured to the forked head of the link 3 and its other member bolted to the lever 1. Any tendency of the lever 1 to oscillate in the direction of the arrow P is thereby damped. FIG. 7 shows a comparable arrangement employing a dash-pot type of damper 25 interposed between the lever 1 and a suitable point on the link 3.

An anchorage arrangement similar to that shown in FIG. 5 (with or without damping means such as shown in FIGS. 6 and 7) may be provided at the opposite end of the cables to that shown in FIG. 5, or the cables may be anchored by conventional means. If the cables are supported intermediately so as to extend over a number of spans, the intermediate suspension devices preferably also comprise a pivoted lever which permits the ends of the cables attached thereto to move in the axial direction without affecting the tensions in the remaining cables. Such an arrangement is shown in FIG. 8, wherein the cables A and B are respectively held by cleats 26, 27 pivotally supported at opposite ends of a lever 28 which is centrally pivoted to a suspension bolt 29, the upper T-shaped end of which is carried by insulators 30, 31, the upper ends of which are secured to pylons or other supports in well known manner. A damping device 47 is preferably provided to eliminate any risk of free oscillation of the lever 28 upon the bolt 29. Used in conjunction with the anchor arrangements for the ends of the cables such as described above with reference to FIG. 5, the intermediate supporting lever 28 will enable the tensions in the adjoining spans of both cables on both sides of said lever to maintain a balance, which will enable the parallelism of the cables to be maintained throughout the spans, and thus preserve substantially unaltered the geometrical "shape" or aspect of the cross-section of the bundle of cables.

An arrangement for equalising the tensions in a bundle of four cables is shown in FIG. 9. The cables A and B are connected to respective arms of a lever 1, while cables C and D are similarly connected to the respective arms of a lever 9 through the intermediary of insulators 32 and adjusters 33 similar to those described above with reference to FIG. 5. The levers 1 and 9 are centrally pivoted upon the opposite ends of a transverse lever 13 having at its centre a pivot 15 for the link 3 connected by knuckle joint 35 to an anchor plate 5. The latter is bolted in known manner from a pylon or the like (not shown).

It will be noted that the levers 1 and 9 are free to pivot in parallel planes which are normal to the plane in which the lever 13 is capable of pivotal movement. Obviously damping devices may be provided to prevent any undesired oscillation of the levers 1, 9 and 13, as already described with reference to FIGS. 6 and 7. The manner in which this suspension arrangement serves to ensure equal tensions in each of the cables A, B, C and D will be evident from the foregoing description with particular reference to FIG. 3.

The method and suitable means for applying the construction described with reference to FIG. 8 to the intermediate support of a bundle of four cables in illustration in FIG. 10. The T-bolt 37 suspended from strings of insulators 38 carries at its lower end a pivotal block 39 rotatable about the longitudinal axis of the bolt 37 and having oppositely extending pins 40, 41 having a common axis perpendicular to the longitudinal axis of the bolt 39. On the pins 40 and 41 are rotatably mounted U-shaped brackets 42, 43 from the ends of which cleats 44 are suspended by the aid of pivot pins 45 which pass horizontally through the apertured lower ends of spherically jointed pins 46 mounted in the arms of the bracket members 42, 43. The cables A, B, C and D are clamped in the cleats 44 and the arrangement is such that the cables are equidistant from the vertical axis of the bolt 37 and are also substantially equidistant from the horizontal axis of the arms 40, 41. Since the brackets 42, 43 are free to turn upon said axes the system will always find its own equilibrium and th tensions in all the cables will be equalised under all normal conditions.

From the foregoing description of the method of applying the invention to bundles of two or four cables, and the means suitable for this purpose, the application of the invention to the case where three similar cables are required to be suspended, as explained above with reference to FIG. 4 or to a greater number of cables will involve no difficulty.

I claim:

1. A cable suspension system comprising a plurality of similar cables suspended in parallel space catenaries by suspension means comprising a similar pair of two-armed levers, pivotal connections similarly spaced apart upon each arm for attachment of a cable, a fulcrum for each lever disposed centrally between the connection thereon and upon a common centre-line therewith, a second two-armed lever carrying said fulcrums on its respective arms, a stationary support and means for pivotally connecting the second lever to said support by a pivot disposed centrally between said fulcrums and upon a common centre-line therewith.

2. A cable suspension system comprising four similar cables suspended in parallel spaced caternaries by suspension means comprising a similar pair of two-armed lever, bolt-joint connections similarly spaced apart on each arm for attachment of the respective cables, a suspension bolt, a stationary support, means for suspending said bolt in a substantially vertical position from said support, pivot pins carried by said bolt with their axes in horizontal alignment and also rotatable about the axis of the bolt, said pins carrying the respective levers intermediate their ends in a substantially upright position parallel to each other and symmetrically disposed with reference to the axis of the bolt.

References Cited by the Examiner
FOREIGN PATENTS
181,889 5/1955 Austria.
597,417 5/1934 Germany.

OTHER REFERENCES
Hilgrath, German printed application 1,099,026, February 1961.

JOHN F. BURNS, *Primary Examiner.*

LARAMIE E. ASKIN, *Examiner.*